United States Patent [19]
Greenwood

[11] Patent Number: 4,567,451
[45] Date of Patent: Jan. 28, 1986

[54] RESONATOR HAVING OPTICAL FEEDBACK COUPLING

[75] Inventor: John C. Greenwood, Harlow, England

[73] Assignee: International Standard Electric Corporation, New York, N.Y.

[21] Appl. No.: 500,129

[22] Filed: Jun. 1, 1983

[30] Foreign Application Priority Data

Jun. 10, 1982 [GB] United Kingdom ................. 8216846

[51] Int. Cl.[4] ............................ G01L 1/10; H03B 5/30
[52] U.S. Cl. ....................................... 331/155; 73/773; 73/778; 73/862.41; 73/862.59; 250/205; 250/227; 310/25; 331/65; 331/156
[58] Field of Search .................... 331/65, 155, 156, 66; 73/778, 773, 704, DIG. 1, DIG. 11, 862.41, 862.59; 340/531, 532; 310/25, 36, DIG. 1; 250/205, 227, 232

[56] References Cited

U.S. PATENT DOCUMENTS 1,962,609 6/1934 Nicolson ......................... 331/155 X
3,019,397 1/1962 Cosby ................................... 331/65
3,529,470 9/1970 Agar ................................. 73/862.59
3,805,190 4/1974 Berlin et al. .................... 331/156 X
4,345,482 8/1982 Adolfsson et al. ............... 73/862.59

OTHER PUBLICATIONS

Berry, "Silicon Reed Electromechanical Oscillator", IBM Technical Disclosure Bulletin, vol. 14, No. 4, Sep. 1971, p. 1235.

*Primary Examiner*—Siegfried H. Grimm
*Attorney, Agent, or Firm*—James B. Raden; William J. Michals

[57] ABSTRACT

A resonator device comprises an elastic beam driven electrostatically at its natural frequency, or an harmonic thereof, by voltage pulses applied to an integral paddle member. The voltage pulses are derived from optical pulses fed via an optical fibre and reflected from the paddle member to a photodiode array. There is thus minimal coupling between the beam and the drive system. A positive feedback loop is provided in which light retroreflected from the paddle member is recaptured by the optical fibre and electronically detected, amplified and fed back in phase with the beam oscillations by modulating the optical pulses.

9 Claims, 3 Drawing Figures

RESONATOR HAVING OPTICAL FEEDBACK COUPLING

This invention relates to transducers or sensors, and in particular to resonant transducers wherein the positive feedback path, whereby oscillations are maintained, incorporates an optical interface.

Electro-mechanical resonant transducers are used as strain sensors in a wide variety of applications. Typically these devices comprise an oscillation system which is maintained in the state of oscillation at its natural frequency, or an harmonic thereof, by a positive feedback loop arrangement. The frequency of oscillation is a function of e.g. strain or pressure applied to the transducer.

The feedback loop of resonator devices at present in use receives a small proportion of the total energy of the oscillating element, amplifies that energy and then feeds it back in the correct phase relationship via drive means to the element. The feedback loop is generally coupled to the element via capacitive or electromagnetic coupling means.

The abstraction of energy from the oscillating system will of course introduce perturbations in the resonant frequency and reduce the Q factor obtainable. Furthermore, in some applications such as the monitoring of hazardous environments, the provision of an electrically coupled feedback loop may be undesirable.

The object of the present invention is to minimise or to overcome these disadvantages.

According to the invention there is provided a resonator device, including a resonator element, and positive feedback means for maintaining said element in a state of oscillation at its natural resonant frequency or at an harmonic thereof, and wherein coupling of the feedback means to the element includes an optical path.

Sensing of the oscillation of the element is effected optically. Thus substantially no energy is removed from the resonating system and the resonating element behaves as a free unimpeded oscillator. Hence a very high degree of frequency stability and accuracy can be achieved. Further, since the coupling to the device is optical, the arrangement is inherently safe in a hazardous, e.g. potentially explosive, environment.

An embodiment of the invention will now be described with reference to the accompanying drawings in which.

Figure 1:
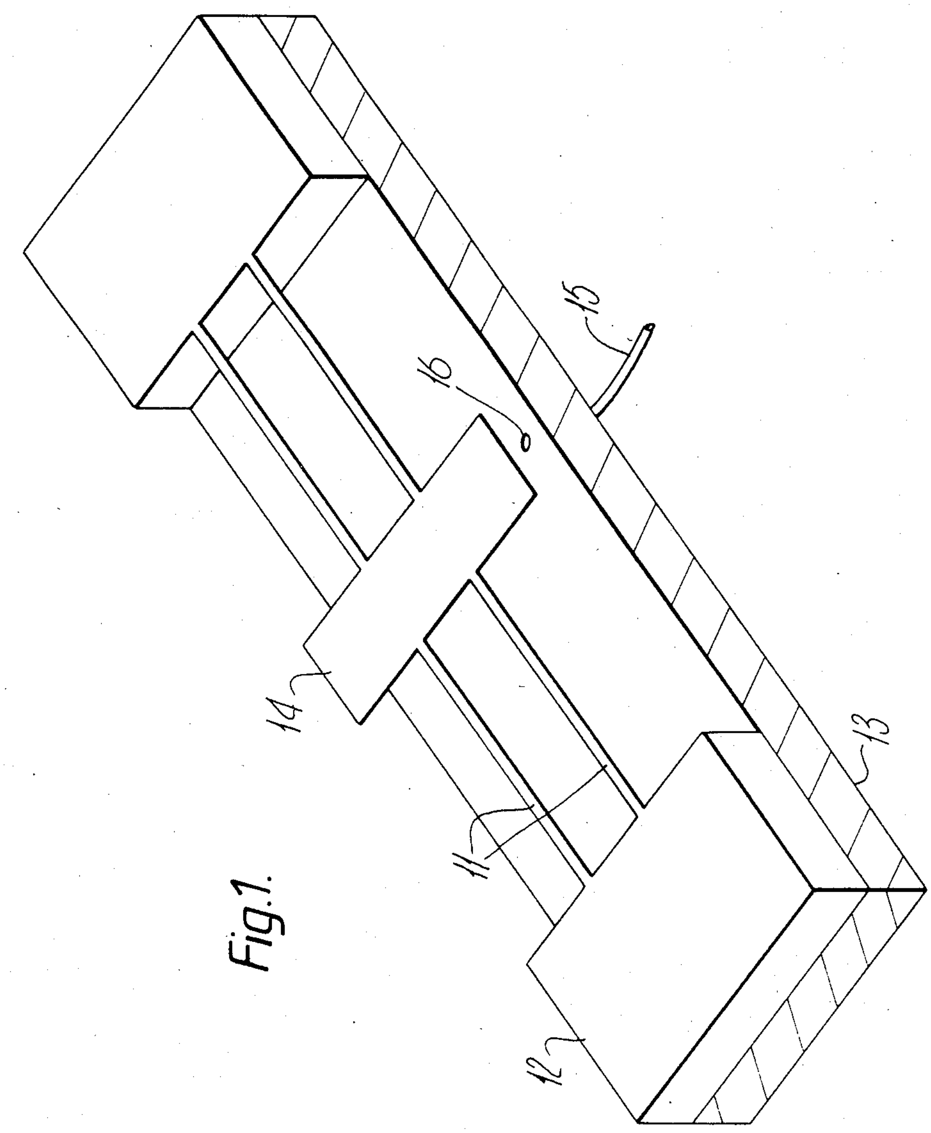
FIG. 1 is a plan view of a resonator device incorporating optical coupling to its feedback path.

Referring to FIG. 1, the resonator device, which is shown by way of example, comprises a twin filament torsional oscillator arrangement. The arrangement, which advantageously is formed by selective etching from a unitary body of an elastic material, e.g. silicon or quartz, includes a pair of filaments 11 disposed in a state of tension between end mounts 12 which in turn are secured to an insulating support or substrate 13. The centre portions of the filaments 11 are coupled by a rigid paddle 14. The arrangement, in use, oscillates in a torsional mode at a frequency corresponding to the tension in the filaments 11.

Driving power to maintain oscillation is provided via an optical fibre 15 mounted in an opening in the substrate and whose free end 16 is disposed adjacent one free end of the paddle 14. The fibre 15 also provides the means whereby a frequency output is obtained from the resonator device.

Figure 2:
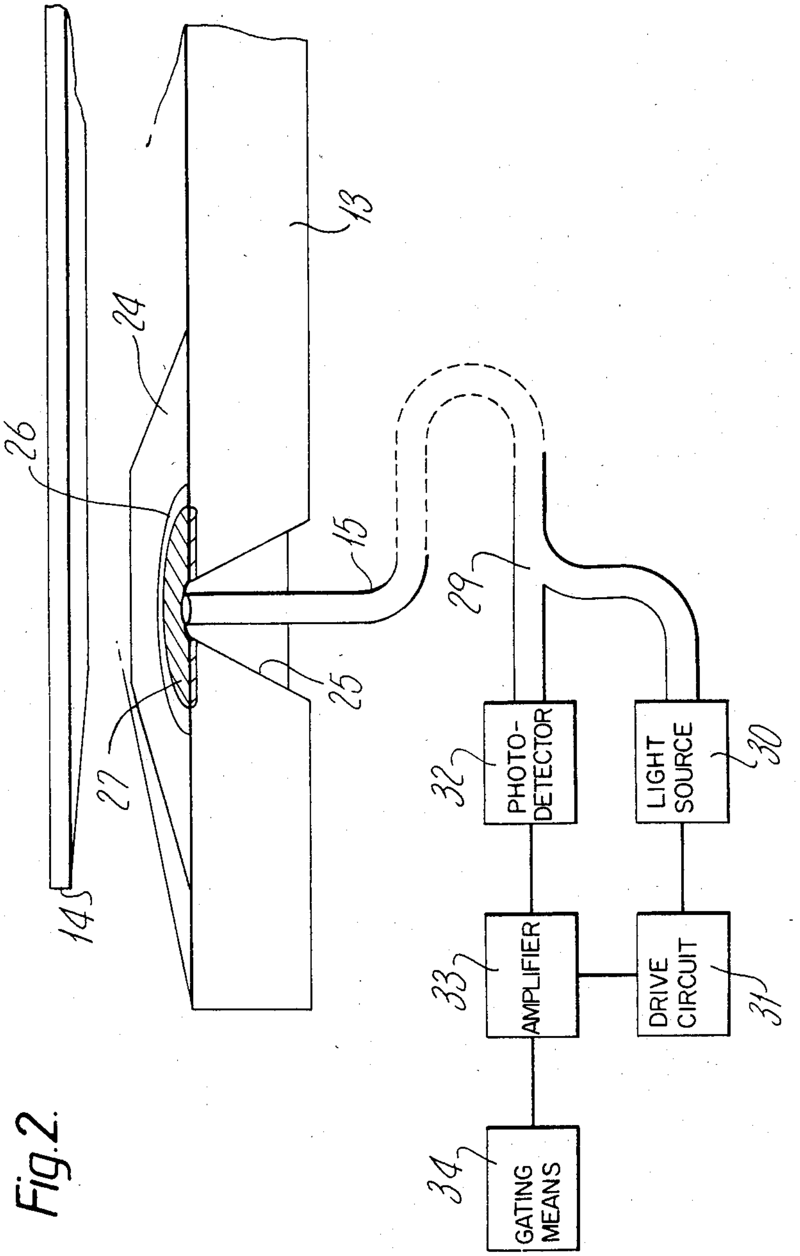
FIG. 2 is a circuit diagram of a feedback and drive arrangement for use with the device of FIG. 1.

FIG. 2 shows the detail of the optical driving and sensing arrangement of the tranducer of FIG. 1. An electrode 24 is disposed on the substrate 13 in register with the free end of the paddle 14 such that the paddle may be driven electrostatically into oscillation by an alternating electric potential applied to the electrode.

As previously stated the substrate 13 is provided with an opening 25, this opening being in register and substantially concentric with a larger opening 26 in the electrode 24. The substrate region between the opening 25 and the electrode opening 26 supports an annular photo-diode array 27, this array being electrically connected between the electrode 24 and a fixed potential, e.g. ground. Advantageously the substrate is of single crystal silicon and the photodiodes of the array are integrated into the silicon surfaces.

The opening 25 in the substrate 13 receives the optical fibre 15 whereby light is directed at the adjacent region of the paddle 14 said region being polished and substantially flat. The light output from the optical fibre 15 is reflected by the paddle 14. Most of this light falls on the photodiode array 27, but a small proportion is reflected back down the fibre.

The remote end of the fibre 15 is coupled via a directional coupler 29 to a modulated light source 30, e.g. a solid state laser. The light source 30 is operated via a drive circuit 31 which circuit operates the source at a steady low level on which high level pulses are superimposed.

Light reflected back along the fibre 15 is fed via the directional coupler 29 to a photodetector 32 the output of which is coupled to an amplifier 33, which amplifier is provided with gating means 34 whereby it is disabled for the duration of each high level pulse from the drive circuit 31.

As the paddle vibrates at the resonant frequency of the oscillator arrangement the amplitude of the reflected light signal received by the photodetector is modulated with an amplitude modulation of identical frequency.

The high level pulses generated by the drive circuit result in the transmission of corresponding high intensity light pulses via the fibre 15. These light pulses impinge on the photodiode array which, in response thereto, generates a voltage pulse that is applied between the electrode 24 and ground. This provides an electrostatic driving potential whereby the paddle 14 is attracted towards the electrode 24 thereby maintaining the arrangement in a state of oscillation. The potential on the photodiodes will of course decay between pulses due to leakage, but this decay can in some applications be decreased by providing a high resistance leakage path from the electrode 24 to ground. Synchronisation of the drive circuit with the oscillating paddle 14 is provided via the feedback path including the amplifier 33.

Figure 3:
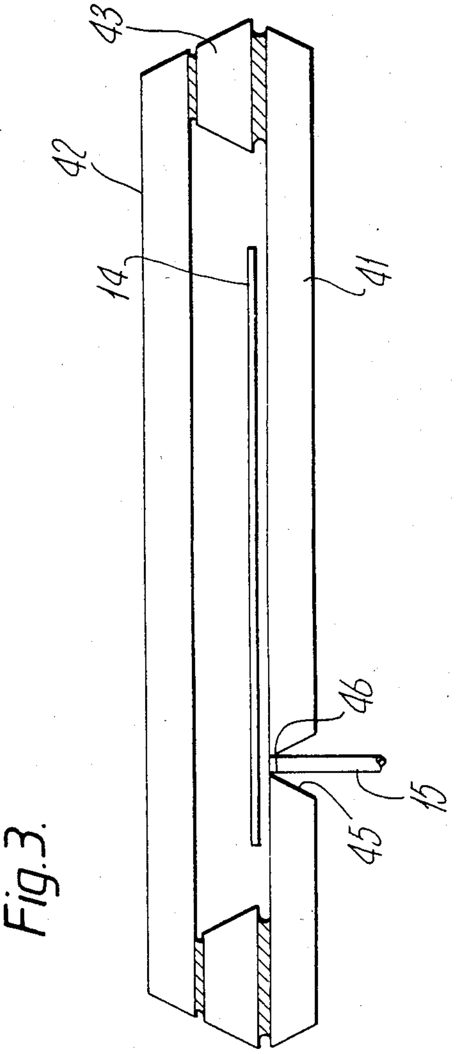
FIG. 3 is a cross-sectional view of an encapsulated resonator device.

Advantageously the oscillator/transducer arrangement of FIG. 1 is disposed in a sealed housing or filled with an inert gas. Such an arrangement is shown in FIG. 3 which is a cross-sectional view of an encapsulated resonator device, the section being taken along the longitudinal axis of the paddle member 14. The arrangement includes a sealed housing comprising a base or substrate 41 and a lid 42, advantageously of silicon, spaced apart and hermetically sealed to a frame member 43 therebetween. Advantageously the frame is also of silicon and is preferably formed integrally with the filament and paddle resonator device. The frame 43 provides a support for the filaments.

An opening 45 is provided in the base 41 of the housing whereby light can be directed to the paddle 14 via an optical fibre 15. For clarity the photodiode array associated with the fibre 15 and the paddle 14 is not shown in this figure. Advantageously the opening 45 is provided with a transparent window 46 whereby hermetic sealing of the housing is secured. The housing is sufficiently flexible to transmit a strain to the filaments thereby determining their oscillatory frequency.

The arrangement described herein may be used as strain or pressure sensors in a variety of applications. Advantageously they may be employed in hazardous environments, e.g. in a potentially explosive atmosphere or in a nuclear reactor, as the absence of any direct electrical coupling to the transducer element renders them inherently safe.

The transducer device described herein may be prepared as an integral structure by selective etching from a body of single crystal silicon.

Typically a silicon body is selectively doped with boron to a level of at least $4\times10^{19}$ atoms/cc in those regions that will ultimately comprise the finished device. The wafer is then etched e.g. with a mixture of catechol, ethylene diamine and water or a mixture of potassium hydroxide, isopropyl alcohol and water. Such etch compositions have been found to be chemically selective when employed with boron doped silicon. There is an abrupt change in etch rate from that normal for undoped silicon to substantially zero at a boron doped interface so that the configuration of unetched regions is defined precisely by their boron doping profiles. Typically a single crystal silicon body is doped with boron through a mask in those areas where etching is not required and is then subjected to the etching treatment to remove only the undoped material. In some cases a plurality of masking, doping and etching stages will be required. Such techniques are more fully described in our published British specification No. 1 211 496 (J. G. Greenwood 6).

Although only a single device is shown in FIG. 1 it will be clear to those skilled in the art that a plurality of such devices may be fabricated simultaneously e.g. on a single semiconductor wafer, the wafer subsequently being subdivided by conventional techniques to form the individual devices.

I claim:

1. In a resonator device of the type having: a substrate; a pair of end mount means both secured to said substrate; filament means mounted between said end mount means for torsional vibration; paddle means integral with said filament means and located intermediate said end mount means to participate in said torsional vibration; and oscillation driving means for driving said paddle means to perform said torsional vibration, and including means for sensing said torsional vibration, and in response thereto providing positive feedback to sustain said torsional vibration; the improvement wherein:

said filament means is integral with said mount means; and said filament means comprises a plurality of individual filaments, each of which is integral with said end mount means and said paddle means.

2. In a resonator device of the type having: a substrate; a pair of end mount means both secured to said substrate; filament means mounted between said end mount means for torsional vibration; paddle means integral with said filament means and located intermediate said end mount means to participate in said torsional vibration; and oscillation driving means for driving said paddle means to perform said torsional vibration, and including means for sensing said torsional vibration, and in response thereto providing positive feedback to sustain said torsional vibration; the improvement wherein:

said filament means is integral with said end mount means;

said oscillation driving means includes a light source, photovoltaic means positioned to receive light from said light source, and electrode means positioned for electrostatically deflecting said paddle means, the electrical output of said photovoltaic means produced in response to said received light being connected to energize said electrode means to drive said paddle means;

and said feedback means includes means for illuminating said paddle means, photoconductive means for receiving light reflected from said paddle means, and means for positively feeding back the output of said photoconductive means to modulate said light source;

said oscillation driving means and said feedback means comprise a common light pipe means to conduct light from said light source to illuminate both said photovoltaic means and said paddle means; and, said light pipe means being arranged to (a) illuminate said paddle means in such manner that light is reflected from said paddle means to said photovoltaic means, and to (b) receive light retroreflected from said paddle means and conduct it to said photoconductive means.

3. A resonator device as in claim 2 wherein:

said electrode means adheres to the surface of said substrate means opposite said paddle means and is formed with an opening;

said photovoltaic means adheres to the surface of said substrate means and is positioned within said opening in said electrode means, whereby to be positioned opposite said paddle means for receiving light reflected therefrom.

4. A resonator device as in claim 3, wherein:

said photovoltaic means is also formed with an opening;

said substrate means is formed with an opening aligned with said opening in said photovoltaic means;

and said light pipe means comprises a fiber optic inserted through said aligned openings to illuminate said paddle means and to recapture light retroreflected therefrom.

5. In a resonator of the type having: substrate means; an oscillating element; means supporting said oscillating element on said substrate means for oscillatory motion; oscillation driving means including a light source, photovoltaic means positioned to receive light from said light source, and electrode means positioned for electrostatically deflecting said oscillating element, the electrical output of said photovoltaic means produced in response to said received light being connected to energize said electrode means to drive said oscillating element; and feedback means including means for illuminating said oscillating element, photoconductive means for receiving light reflected from said oscillating element, and means for positively feeding back the output of said photoconductive means to modulate said light source; the improvement wherein:

said oscillation driving means and said feedback means comprise a common light pipe means to conduct light from said light source to illuminate both said photovoltaic means and said oscillating element;

said light pipe means being arranged to (a) illuminate said oscillating element in such manner that light is reflected from said oscillating element to said photovoltaic means, and to (b) receive light retroreflected from said oscillating element and conduct it to said photoconductive means.

6. A resonator device as in claim 5, wherein:

said oscillating element comprises a light-reflective, electrostatically responsive body suspended adjacent said substrate;

said electrode means adheres to the surface of said substrate means opposite said oscillating element and is formed with an opening;

and said photovoltaic means adheres to the surface of said substrate means and is positioned within said opening in said electrode means whereby to be positioned opposite said oscillating means for receiving light reflected therefrom.

7. A resonator device as in claim 6, wherein:

said photovoltaic means is also formed with an opening;

said substrate means is formed with an opening aligned with said opening in said photovoltaic means;

and said light pipe means comprises a fiber optic inserted through said aligned openings to illuminate said oscillating element and to recapture light retroreflected therefrom.

8. A resonator device as in claim 5 wherein:

said substrate has a pair of end mount means mounted thereon;

and said oscillating means includes filament means integral with, and extending between, said end mount means, and adapted to vibrate in a torsional mode, and paddle means integral with said filament means and located intermediate said end mount means to participate in said torsional vibration.

9. A resonator device as in claim 8 wherein:

said filament means comprises a plurality of individual filaments, each of which is integral with said end mount means and said paddle means.

* * * * *